(12) United States Patent
Dang et al.

(10) Patent No.: US 6,444,722 B1
(45) Date of Patent: Sep. 3, 2002

(54) MAKING POLYOLEFIN GRAFT COPOLYMERS WITH LOW MOLECULAR WEIGHT SIDE CHAINS USING A POLYMERIC PEROXIDE AS AN INITIATOR

(75) Inventors: Vu A. Dang, Bear; Cheng Q. Song, Wilmington, both of DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 49 days.

(21) Appl. No.: 09/703,488

(22) Filed: Nov. 2, 2000

(51) Int. Cl.$^7$ .......................... C08J 3/28; C08F 255/02
(52) U.S. Cl. .................. 522/157; 522/158; 522/161; 522/114; 522/120; 522/122; 522/125; 525/244; 525/259; 525/261; 525/266; 525/284; 525/302
(58) Field of Search .................. 522/157, 161, 522/158, 125, 122, 120, 114; 526/235, 351, 346, 347, 339, 270

(56) References Cited

U.S. PATENT DOCUMENTS

| | | | |
|---|---|---|---|
| 3,493,480 A | | 2/1970 | Kuroda et al. ......... 204/159.17 |
| 5,077,337 A | * | 12/1991 | Atwell et al. |
| 5,411,994 A | | 5/1995 | Galli et al. ................ 521/50.5 |
| 5,817,707 A | | 10/1998 | DeNicola, Jr. et al. ..... 522/157 |
| 5,916,974 A | | 6/1999 | Song et al. ................. 525/244 |
| 6,136,926 A | | 10/2000 | Raetzsch et al. ............ 525/254 |

FOREIGN PATENT DOCUMENTS

| | | | |
|---|---|---|---|
| EP | 0519341 | 12/1992 | ......... C08F/255/00 |
| EP | 0849318 | 6/1998 | ............. C08K/5/32 |
| WO | 9711097 | 3/1997 | ............. C08F/2/46 |
| WO | 0015679 | 3/2000 | ......... C08F/291/18 |

\* cited by examiner

Primary Examiner—Susan W. Berman

(57) ABSTRACT

Graft copolymers with low molecular weight side chains are prepared by (1) irradiating a propylene polymer material in the absence of oxygen, (2) adding a controlled amount of oxygen to the irradiated polymer material so that the polymer is exposed to an amount of oxygen greater than 0.004% but less than 15% by volume at a temperature of 40° C. to 140° C., to produce an oxidized propylene polymer material containing greater than 1 mmol total peroxide per kilogram of propylene polymer material, (3) optionally, heating the oxidized propylene polymer material in a non-oxidizing atmosphere to a temperature of at least 80° C. but below the softening point of the polymer, and (4) treating the oxidized propylene polymer material in a non-oxidizing atmosphere with at least one grafting monomer that is capable of being polymerized by free radicals, in the presence of at least one additive to control the molecular weight of the side chains of the polymerized grafting monomer selected from (a) at least one hydroxylamine derivative polymerization inhibitor, and (b) at least one thio-, nitro-, or halogen-substituted aliphatic or aromatic compound, or an aliphatic or aromatic phosphine derivative, and (5) deactivating the residual free radicals in the resulting grafted propylene polymer material and removing any unreacted vinyl monomer from the material.

10 Claims, No Drawings

MAKING POLYOLEFIN GRAFT COPOLYMERS WITH LOW MOLECULAR WEIGHT SIDE CHAINS USING A POLYMERIC PEROXIDE AS AN INITIATOR

FIELD OF THE INVENTION

This invention relates to a method for making graft copolymers of propylene polymer materials.

BACKGROUND OF THE INVENTION

Polyolefin graft copolymers can be made by any one of various methods, including forming active sites on the polyolefin either in the presence of the grafting monomers, or followed by treatment with the monomer. The grafting sites can be produced by treatment with a peroxide or other chemical compound that is a free radical polymerization initiator, or by irradiation with high energy ionizing radiation. The free radicals produced in the olefin polymer as a result of the chemical or irradiation treatment act as initiators for the polymerization of the monomer, as well as active sites for grafting.

For example, U.S. Pat. No. 5,411,994 discloses making polyolefin graft copolymers by irradiating olefin polymer particles and treating with a vinyl monomer in liquid form. A non-oxidizing environment is maintained throughout the process. U.S. Pat. No. 5,817,707 discloses a process for making a graft copolymer by irradiating a porous propylene polymer material in the absence of oxygen, adding a controlled amount of oxygen to produce an oxidized propylene polymer material and heating, dispersing the oxidized polymer in water in the presence of a surfactant, adding a redox initiator system, and then adding a vinyl monomer.

Various additives have been used to modify certain characteristics of graft copolymers such as the morphology of the polymer particles. For example, U.S. Pat. No. 5,916,974 discloses graft polymerizing in the presence of an organic peroxide and a polymerization rate modifier (PRM) to increase the polymerization induction time on the polymer surface, consequently facilitating monomer diffusion into the interior of the polymer particles so that surface polymerization of the monomer is inhibited. Suitable PRMs include sulfur, benzoquinone and its derivatives, and hydroxylamine and its derivatives. The PRM has no significant impact on the number average and weight average molecular weight of the product.

There is a need for a process for controlling the molecular weight of the polymerized monomer side chains of polypropylene graft copolymers made from irradiated propylene polymer materials, so that low molecular weight side chains are produced without adversely affecting the overall physical properties of the graft copolymer.

SUMMARY OF THE INVENTION

The process of this invention for making graft copolymers comprises:

(1) irradiating a propylene polymer material in an environment in which the concentration of active oxygen is equal to or less than 0.004% by volume, (2) adding a controlled amount of oxygen to the irradiated propylene polymer material so that the polymer is exposed to an amount of oxygen greater than 0.004% and less than 15% by volume at a temperature of about 40° C. to about 140° C., to produce an oxidized propylene polymer material containing greater than 1 mmol total peroxide per kilogram of propylene polymer material, (3) optionally, heating the oxidized propylene polymer material in a substantially non-oxidizing atmosphere at a temperature of at least 80° C. but below the softening point of the polymer, (4) treating the oxidized propylene polymer material in a substantially non-oxidizing atmosphere at a temperature of about 110° to about 140° C. with about 5 to about 240 parts per hundred parts of the propylene polymer material of at least one grafting monomer that is capable of being polymerized by free radicals to form side chains on the propylene polymer material, in the presence of about 1 part to about 10,000 parts per million parts of monomer of at least one additive to control the molecular weight of the side chains of the polymerized grafting monomer, selected from the group consisting of (a) at least one hydroxylamine derivative polymerization inhibitor and (b) at least one chain transfer agent selected from the group consisting of (i) thio-substituted aliphatic and aromatic compounds, (ii) halogen-substituted aliphatic and aromatic compounds, (iii) nitro-substituted aliphatic and aromatic compounds, and (iv) aliphatic and aromatic phosphine derivatives, and (5) simultaneously or successively in optional order, (i) deactivating substantially all residual free radicals in the resultant grafted propylene polymer material, and (ii) removing any unreacted vinyl monomer from the material.

Carrying out the graft polymerization reaction in the presence of a hydroxylamine derivative polymerization inhibitor and/or the specified chain transfer agents produced graft copolymers with low molecular weight side chains without adversely affecting the physical properties of the graft copolymer.

DETAILED DESCRIPTION OF THE INVENTION

The propylene polymer material that is used as the backbone of the graft copolymer can be:

(1) a crystalline homopolymer of propylene having an isotactic index greater than 80, preferably about 85 to about 99;

(2) a crystalline copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85; or (3) a crystalline terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85.

The 4–10 C alpha-olefins that can be used when the propylene polymer material is a copolymer or terpolymer of propylene include, for example, 1-butene; isobutylene; 3-methyl-1-butene; 3,4-dimethyl-1-butene; 1-pentene; 1-hexene; 4-methyl-1-pentene; 3-methyl-1-hexene; 1-heptene; 1-octene, and 1-decene.

Propylene homopolymer is the preferred propylene polymer backbone material.

When the monomer add level is high, i.e., greater than 20 parts of monomer per hundred parts of the olefin polymer material, it is preferable for some applications to use spherical particles having a weight average diameter of about 0.4–7 mm, a surface area of at least 0.1 m²/g, and a pore volume fraction of at least about 0.07, and wherein more than 40% of the pores in the particle, preferably more than 50%, and most preferably more than 90%, have a diameter greater than 1 micron. The pore volume fraction is preferably at least 0.12, most preferably at least 0.20.

The propylene polymer material used as the backbone of the graft copolymer is exposed to high energy ionizing radiation in an essentially oxygen-free environment, i.e., an environment in which the active oxygen concentration is established and maintained at 0.004% by volume or less. The ionizing radiation should have sufficient energy to penetrate to the extent desired the mass of propylene polymer material being irradiated. The ionizing radiation can be of any kind, but the most practical kinds are electrons and gamma rays. Preferred are electrons beamed from an electron generator having an accelerating potential of 500–4000 kilovolts. Satisfactory results in terms of grafting level are achieved with an ionizing radiation dose of about 0.5–12 Mrad, preferably about 0.5–9 Mrad, and most preferably about 0.5 to about 4 Mrad.

The term "rad" is usually defined as that quantity of ionizing radiation that results in the absorption of 100 ergs of energy per gram of irradiated material, regardless of the source of radiation. In the usual practice of the method described herein, energy absorption from ionizing radiation is measured by the well know conventional dosimeter, a measuring device in which a strip of polymer film containing a radiation-sensitive dye is the energy absorption sensing means. Therefore the term "rad" means that quantity of ionizing radiation resulting in the absorption of the equivalent of 100 ergs of energy per gram of the polymer film of a dosimeter placed at the surface of the propylene polymer material being irradiated.

The free radical-containing irradiated propylene polymer material is then subjected to an oxidative treatment step. The oxidative treatment step consists of heating the irradiated polymer in the presence of a controlled amount of active oxygen in the range of greater than 0.004% but less than 15% by volume, preferably less than 8%, and most preferably less than 3%, to a temperature of about 40° C. to about 140° C. Heating to the desired temperature is accomplished as quickly as possible, preferably in less than 10 minutes. The polymer is then held at the selected temperature, typically for about 90 minutes, to increase the reaction rate of the oxygen with the free radicals in the polymer. The holding time, which can easily be determined by one skilled in the art, depends upon the properties of the starting material, the oxygen concentration used, the radiation dose, and the temperature. The maximum time is determined by the physical constraints of the fluid bed.

Step (2) of the process of this invention can be carried out as one step, or the polymer can be heated in two steps, e.g., first at 80° C. and then at 140° C., while exposing to the specified amount of oxygen. The preferred way of carrying out the treatment in two steps is to pass the irradiated polymer through a first fluid bed assembly operating at $T_1$ in the presence of a controlled amount of oxygen, and then through a second fluid bed assembly operating at $T_2$ in the presence of a controlled amount of oxygen within the same range as in the first step. In commercial operation a continuous process using separate fluid beds is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent resolidification and comminution into the desired form.

The expression "active oxygen" means oxygen in a form that will react with the irradiated propylene polymer material. It includes molecular oxygen, which is the form of oxygen normally found in air. The active oxygen content requirement of the process of this invention can be achieved by use of a vacuum or by replacing part or all of the air in the environment by an inert gas such as, for example, nitrogen or argon.

The concentration of peroxide groups formed on the polymer can easily be controlled by varying the radiation dose and the amount of oxygen to which the polymer is exposed after irradiation. The oxygen level in the fluid bed gas stream is controlled by the addition of air at the inlet to the fluid bed. Air must constantly be added to compensate for the oxygen consumed by the formation of peroxide groups on the polymer. The fluidizing medium can be, for example, nitrogen or any other gas that is inert with respect to the free radicals present, e.g., argon, krypton and helium.

At the end of the oxidative treatment step, an oxidized propylene polymer material is formed that contains greater than 1 mmol total peroxide per kilogram of polymer. The amount of total peroxide affects the melt flow rate (MFR) of the product, i.e., polymers with a higher total peroxide content produce products with a higher MFR.

In the optional third step of the process, the oxidized propylene polymer material is heated in a substantially non-oxidizing atmosphere at a temperature of at least 80° C. but below the softening point of the polymer. A more stable product is produced if this step is carried out. It is preferred to use this step if the oxidized propylene polymer material is going to be stored rather than used immediately, or if the radiation dose that is used is on the high end of the range mentioned above. The polymer is then cooled to a temperature of about 70° C. over a period of about 10 minutes in a substantially oxygen-free atmosphere, i.e., 0.004% by volume or less, before being discharged from the bed. In this manner stable intermediates are formed that can be stored at room temperature for long periods of time without further degradation.

In step (4) of the process of this invention, the oxidized propylene polymer material, while being maintained in a substantially non-oxidizing atmosphere (see below), is then treated with at least one vinyl monomer as a liquid or in solution, optionally diluted with a suitable diluent, preferably by adding the liquid monomer or monomer solution to, and/or dispensing it onto the particulate material at a controlled rate, while the material is agitated or conveyed by any suitable conveying means. Most preferably the liquid monomer or monomer solution is added by releasing a fine mist or spray of at least one monomer onto the oxidized propylene polymer material while the particles are in motion, either relative to each other or to the point from which the monomer is released or dispensed. The temperature during the graft polymerization step is generally about 110° to about 140° C., preferably about 125° to about 140° C.

Solvents and diluents useful in the practice of the method of this invention are those compounds that are inert with respect to the propylene polymer material and are not polymerizable by free radicals, and that have a chain transfer constant of less than about $1 \times 10^{-3}$. Suitable solvents and diluents include ketones, such as acetone; alcohols, such as methanol; aromatic hydrocarbons, such as benzene and xylene; and cycloaliphatic hydrocarbons, such as cyclohexane.

The expression "substantially non-oxidizing" is used to describe the environment or atmosphere to which the irradiated propylene polymer material is exposed before the deactivation of residual free radicals. The active oxygen concentration, i.e., the concentration of oxygen in a form that will react with the free radicals in the irradiated material, is less than about 15%, preferably less than about 5%, and more preferably less than about 1%, by volume. The most preferred concentration of active oxygen is 0.004% or lower by volume. Within these limits, the non-oxidizing atmosphere can be any gas, or mixture of gases, that is oxidatively inert toward the free radicals in the olefin polymer material, e.g., nitrogen, argon, helium, and carbon dioxide.

The grafting monomers that are capable of being polymerized by free radicals include any monomeric vinyl compound capable of being polymerized by free radicals, wherein the vinyl radical $H_2C=CR-$, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine, and (2) unsaturated aliphatic nitriles and carboxylic acids and their esters including acrylonitrile; methacrylonitrile; acrylic acid; acrylate esters such as the methyl, ethyl, hydroxyethyl, 2-ethylhexyl, and butyl acrylate esters; methacrylic acid; methacrylate esters, such as the methyl, ethyl, butyl, benzyl, phenylethyl, phenoxyethyl, epoxypropyl, and hydroxpropyl methacrylate esters. Multiple monomers from the same or different classes can be employed. When a hydroxylamine compound is used as the molecular weight control additive, monomers containing carboxylic acid groups should not be used because they will react with the hydroxylamine compound.

The total amount of monomer or monomers used is about 5 parts to about 240 parts, preferably about 20 parts to about 100 parts, per hundred parts of the propylene polymer material.

During the graft polymerization, the monomers also polymerize to form a certain amount of free or ungrafted polymer or copolymer. Any reference to "polymerized monomers" in this specification is meant to include both grafted and ungrafted polymerized monomers. The morphology of the graft copolymer is such that the olefin polymer material is the continuous or matrix phase, and the polymerized monomers, both grafted and ungrafted, are a dispersed phase. Although the weight average molecular weight of the grafted side chains of polymerized monomer cannot be measured directly, the weight average molecular weight ($M_w$) of the grafted side chains is correlated with the $M_w$ of the chains of ungrafted polymerized monomer, since the polymerization conditions are similar in both cases.

The graft polymerization reaction of this invention is carried out in the presence of at least one additive that controls the molecular weight of the polymerized monomer, i.e., one that produces low $M_w$ side chains on the olefin polymer backbone. Low $M_w$ in this regard means lower than the $M_w$ of the polymerized monomer when the graft copolymer is made in the absence of a molecular weight control additive. The additive is present in an amount of about 1 part to about 10,000 parts per million parts of monomer, preferably about 100 parts to about 5000 parts, and most preferably about 250 parts to about 1500 parts.

The molecular weight control additive can be at least one hydroxylamine derivative polymerization inhibitor (PI) such as, for example, N,N-diethylhydroxylamine; N,N-dimethylhydroxylamine; N,N-dipropylhydroxylamine, and N-nitrosophenyl-hydroxylamine. N,N-diethylhydroxylamine is preferred. More than one PI can be used, provided that the compounds selected do not react with each other.

The molecular weight control additive can also be at least one chain transfer agent that is a thio-, nitro-, or halogen-substituted aliphatic or aromatic compound, or an aliphatic or aromatic phosphine derivative. Suitable chain transfer agents include, for example, octadecanethiol; bromotrichloromethane; triethylene glycol dimercaptan; benzene sulfide; dodecanethiol; mesityl disulfide; benzenethiol; hydrogen sulfide; carbon tetrabromide; carbon tetrachloride; tribromoacetic acid; 2,4,6-trinitroaniline; 2,4,6-trinitroanisole; 1,3,5-trinitrobenzene; phenyl phosphine, and diethyl phosphine. More than one chain transfer agent can be used, provided that the compounds selected do not react with each other. A combination of polymerization inhibitors and chain transfer agents can also be used, provided that the compounds selected do not react with each other.

Use of a PI does not significantly affect the grafting efficiency during the graft polymerization reaction. When a chain transfer agent is used as the molecular weight control additive, the grafting efficiency will generally be lower than when a molecular weight control additive is not present. The physical properties of the graft copolymer are not adversely affected by the presence of the low molecular weight side chains on the polymer.

Forming of the graft copolymers can be carried out by methods known in the art including, for example, thermoforming, injection molding, sheet extrusion, profile extrusion, and blow molding. Films and fibers can also be made from these graft copolymers. The graft copolymers of this invention can also be used as compatibilizers for olefin polymers as well as blends of olefin polymers and non-olefin polymers, and as coupling agents for glass-reinforced and mineral-filled polyolefins.

Isotactic index is defined as the percent of propylene polymer insoluble in xylene. The weight percent of propylene polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

The melt flow rate (MFR) of the propylene polymer materials was measured using ASTM D-1238 at 230° C. and 2.16 kg.

Pore volume fraction values are determined by a mercury porosimetry technique in which the volume of mercury absorbed by the particles is measured. The volume of mercury absorbed corresponds to the volume of the pores. This method is described in Winslow, N. M. and Shapiro, J. J., "An Instrument for the Measurement of Pore-Size Distribution by Mercury Penetration," ASTM Bull., TP 49, 39–44 (February, 1959), and Rootare, H. M., "A Review of Mercury Porosimetry," 225–252 (In Hirshhom, J. S. and Roll, K. H., Eds., *Advanced Experimental Techniques in Powder Metallurgy*, Plenum Press, New York, 1970).

Surface area measurements are made by the B.E.T. method as described in JACS 60, 309 (1938).

Weight average molecular weight is determined by gel permeation chromatography.

The grafting efficiency $GE=100\times(C_o-C)/C_o$, where $C$ and $C_o$ are respectively the concentration (in pph of xylene) of the soluble polymerized monomer fraction and the total graft copolymer.

The amount of peroxide in the oxidized propylene polymer material is determined according to the method described by Siggia and Hanna in *Quantitative Organic Analysis (via Functional Groups)*, 4th Ed., pp. 334–342.

In this specification, all parts and percentages are by weight unless otherwise noted.

EXAMPLE 1

This example shows the effect on the weight average molecular weight ($M_w$) of the ungrafted chains of polymerized monomer when varying amounts of a hydroxylamine derivative polymerization inhibitor were present. The graft copolymers were made from a propylene homopolymer to which polystyrene was graft polymerized.

The oxidized propylene homopolymer was prepared by irradiating propylene homopolymer flake having a MFR of 9.1 dg/min and a porosity of 0.45 cm$^3$/g, available from Basell USA Inc., in an inert atmosphere under an electron beam at a dose of 0.5 Mrad. The irradiated polymer was treated with 0.8% by volume oxygen at 140° C. for 60 minutes. After the oxygen treatment, the polymer was treated at 140° C. for one hour in a nitrogen atmosphere and then cooled.

Oxidized propylene homopolymer (100 parts) that contained 9.6 mmol of total peroxide per kilogram of polymer was added to a jacketed reactor that was purged with nitrogen. The reactor was equipped with a thermocouple, an air driven agitator, and a helical impeller. The reactor was then heated to 135° C. A mixture of styrene (40 parts per hundred parts of propylene homopolymer) (pph) and the amount of diethylhydroxylamine (DEHA) polymerization inhibitor (parts per million parts of styrene) (ppm) shown in Table 1 was added at a rate of 5 ml per minute. The temperature was kept constant at 135° C. during monomer addition. After the addition of monomer was complete, the temperature was maintained at 135° C. for 60 minutes. A stream of nitrogen was introduced to the reactor for another 60 minutes at 135° C. to remove residual monomer and thermally deactivate unreacted free radicals. The reactor was then cooled to 50° C., and the grafted polymer was removed from the reactor.

When no inhibitor was used, the procedure was the same as above except that only styrene was added to the reactor.

After the graft copolymers were prepared, they were passed through a Haake twin screw extruder at a temperature of 450° F. to homogenize the product.

The results of the measurement of the $M_w$ of the ungrafted chains of polymerized monomer and the grafting efficiency (GE) are given in Table 1.

TABLE 1

| DEHA (ppm) | Monomer (40 pph) | $M_w \times 10^3$ | GE (%) |
|---|---|---|---|
| None | Styrene | 326 | 36 |
| 100 | Styrene | 295 | 33 |
| 250 | Styrene | 252 | 33 |
| 500 | Styrene | 183 | 33 |
| 1000 | Styrene | 112 | 34 |

The data show that when a hydroxylamine polymerization inhibitor was present, the $M_w$ of the ungrafted chains of polymerized monomer was significantly lower than that of the control without an additive, and that the $M_w$ decreased as the amount of polymerization inhibitor increased.

EXAMPLE 2

This example shows the effect on the $M_w$ of the ungrafted chains of polymerized monomer when varying amounts of a hydroxylamine derivative polymerization inhibitor were present. The graft copolymer was made from a propylene homopolymer to which polystyrene was graft polymerized.

The oxidized propylene homopolymer was made as described in Example 1.

The polystyrene-grafted propylene homopolymer was prepared as described in Example 1 except that a temperature of 120° C. was used in all cases instead of 135° C. The amount of polymerization inhibitor added to each sample is given in Table 2.

The graft copolymer samples were extruded to homogenize the product as described in Example 1.

The results of the measurement of the $M_w$ of the chains of ungrafted polymerized monomer and the grafting efficiency (GE) are given in Table 2.

TABLE 2

| DEHA (ppm) | Monomer (40 pph) | $M_w \times 10^3$ | GE (%) |
|---|---|---|---|
| None | Styrene | 465 | 35 |
| 100 | Styrene | 421 | 36 |
| 250 | Styrene | 324 | 37 |
| 500 | Styrene | 181 | 34 |
| 1000 | Styrene | 104 | 50 |

The data shown that when a hydroxylamine polymerization inhibitor was present, the $m_w$ of the chains of ungrafted polymerized monomer was significantly lower than that of the control without an additive, and that the $M_w$ decreased as the amount of polymerization inhibitor present increased.

EXAMPLE 3

This example shows the effect on the $M_w$ of the chains of ungrafted polymerized monomer when a chain transfer agent was present. The graft copolymer was made from a propylene homopolymer to which polystyrene was grafted.

The oxidized propylene homopolymer was made as described in Example 1, except that 1.45% oxygen was added instead of 0.8% by volume.

Oxidized propylene homopolymer (100 parts) that contained 12.3 mmol of total peroxide per kilogram of polymer was added to the jacketed reactor described in Example 1 after the reactor was purged with nitrogen. The reactor was then heated to 140° C. A mixture of styrene (85 pph) and bromotrichloromethane in the amounts shown in Table 3 was added to the reactor at a rate of 1 pph per minute. After the addition of monomer was complete, the temperature was maintained at 140° C. for 60 minutes. A stream of nitrogen was introduced to the reactor at 140° C. for another 60 minutes to remove residual monomer and thermally deactivate unreacted free radicals. The reactor was then cooled to 50° C., and the grafted polymer was removed from the reactor.

The same procedure was used when octadecanethiol was used as the chain transfer agent (CTA).

The graft copolymer samples were extruded to homogenize the product as described in Example 1.

The results of the measurement of the $M_w$ of the ungrafted chains of polymerized monomer and the grafting efficiency are shown in Table 3.

TABLE 3

| Monomer (85 pph) | Chain Transfer Agent | CTA Concentration (ppm) | $M_w \times 10^3$ | GE (%) |
|---|---|---|---|---|
| Styrene | None | — | 310 | 39.4 |
| Styrene | Bromotrichloromethane | 50 | 300 | 36.7 |
| Styrene | Bromotrichloromethane | 500 | 260 | 32 |
| Styrene | Octadecanethiol | 750 | 300 | 29 |

The data show that $M_w$ decreased when a chain transfer agent was present compared to the control without an additive.

EXAMPLE 4

This example shows the effect on the $M_w$ of the chains of ungrafted polymerized monomer when a chain transfer agent was present. The graft copolymer was made from a propylene homopolymer to which poly(vinylpyrrolidone) was grafted.

The oxidized propylene homopolymer was made as described in Example 3.

Oxidized propylene homopolymer (100 parts) that contained 12.3 mmol of total peroxide per kilogram of polymer was added to the reactor described in Example 1 and the reactor was purged with nitrogen. The reactor was then heated to 140° C. A mixture of vinylpyrollidone (30 pph) and bromotrichloromethane (1500 ppm) was added to the reactor at a rate of 1 pph per minute. The temperature was kept constant at 140° C. during the addition of monomer. After addition of the monomer was complete, the temperature was maintained at 140° C. for 60 minutes. A stream of nitrogen was introduced at 140° C. for another 60 minutes to remove residual monomer and thermally deactivate unreacted free radicals. The reactor was then cooled to 50° C., and the grafted polymer was removed from the reactor.

The graft copolymer samples were extruded to homogenize the product as described in Example 1.

The results of the measurement of the $M_w$ of the ungrafted chains of polymerized monomer and the grafting efficiency are given in Table 4.

TABLE 4

| Monomer (30 pph) | Chain Transfer Agent | CTA Concentration (ppm) | $M_w \times 10^3$ | GE (%) |
|---|---|---|---|---|
| Vinylpyrolidone | None | — | 150 | 48 |
| Vinylpyrolidone | Bromotrichloromethane | 1500 | 42 | 16 |

The data show that the $M_w$ of the chains of polymerized monomer decreased when a chain transfer agent was used during the preparation of the graft copolymer, compared to the control without an additive.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for making graft copolymers comprising:
   (1) irradiating a propylene polymer material in an environment in which the concentration of active oxygen is equal to or less than 0.004% by volume,
   (2) adding a controlled amount of oxygen to the irradiated propylene polymer material so that the polymer is exposed to an amount of oxygen greater than 0.004% and less than 15% by volume at a temperature of about 40° C. to about 140° C., to produce an oxidized propylene polymer material containing greater than 1 mmol total peroxide per kilogram of propylene polymer material,
   (3) optionally, heating the oxidized propylene polymer material in a substantially non-oxidizing atmosphere at a temperature of at least 80° C. but below the softening point of the polymer,
   (4) treating the oxidized propylene polymer material in a substantially non-oxidizing atmosphere at a temperature of about 110° to about 140° C. with about 5 to about 240 parts per hundred parts of the propylene polymer material of at least one grafting monomer that is capable of being polymerized by free radicals to form side chains on the propylene polymer material, in the presence of about 1 part to about 10,000 parts per million parts of monomer of at least one additive to control the molecular weight of the side chains of the polymerized grafting monomer, selected from the group consisting of (a) at least one hydroxylamine derivative polymerization inhibitor and (b) at least one chain transfer agent selected from the group consisting of (i) thio-substituted aliphatic and aromatic compounds, (ii) halogen-substituted aliphatic and aromatic compounds, (iii) nitro-substituted aliphatic and aromatic compounds, and (iv) aliphatic and aromatic phosphine derivatives, and
   (5) simultaneously or successively in optional order, (i) deactivating substantially all residual free radicals in the resultant grafted propylene polymer material, and (ii) removing any unreacted vinyl monomer from the material.

2. The process of claim 1 wherein the propylene polymer material is selected from the group consisting of:

(1) a crystalline homopolymer of propylene having an isotactic index greater than 80;

(2) a crystalline copolymer of propylene and an olefin selected from the group consisting of ethylene and 4–10 C alpha-olefins, provided that when the olefin is ethylene, the maximum polymerized ethylene content is about 10%, and when the olefin is a 4–10 C alpha-olefin, the maximum polymerized content thereof is about 20% by weight, the copolymer having an isotactic index greater than 85; and (3) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85.

3. The process of claim 2 wherein the propylene polymer material is a propylene homopolymer.

4. The process of claim 1 wherein the hydroxylamine derivative is selected from the group consisting of (a) N,N-diethylhydroxylamine, (b) N,N-dimethylhydroxylamine, (c) N,N-dipropylhydroxylamine, and (d) N-nitrosophenylhydroxylamine.

5. The process of claim 4 wherein the hydroxylamine derivative is N,N-diethylhydroxylamine.

6. The process of claim 1 wherein the chain transfer agent is a thio-substituted aliphatic compound.

7. The process of claim 6 wherein the chain transfer agent is octadecanethiol.

8. The process of claim 6 wherein the chain transfer agent is triethylene glycol dimercaptan.

9. The process of claim 1 wherein the chain transfer agent is a halogen-substituted aliphatic compound.

10. The process of claim 9 wherein the chain transfer agent is bromotrichloromethane.

* * * * *